(Model.)
H. AHREND.
Hand-Cuff.
No. 226,949. Patented April 27, 1880.
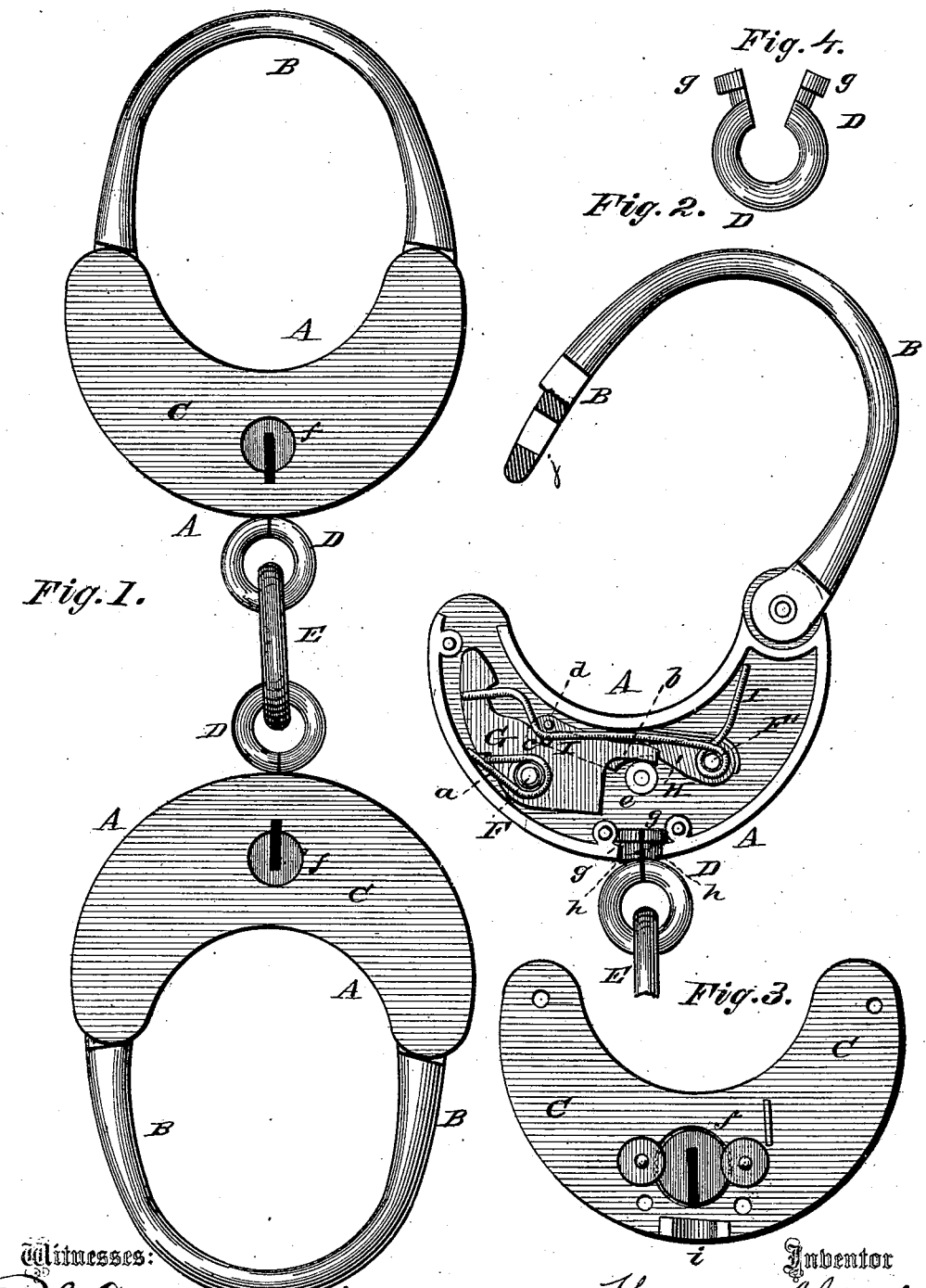
Witnesses:
P. C. Dietrich
Wm Dupperman
Inventor
Hermann Ahrend
Per C. A. Watson & Co. Attorneys.
N. PETERS, PHOTO-LITHOGRAPHER, WASHINGTON, D. C.

UNITED STATES PATENT OFFICE.

HERMANN AHREND, OF NEWARK, NEW JERSEY, ASSIGNOR TO ROMER & CO., OF SAME PLACE.

HANDCUFF.

SPECIFICATION forming part of Letters Patent No. 226,949, dated April 27, 1880.

Application filed March 11, 1880. (Model.)

*To all whom it may concern:*

Be it known that I, HERMANN AHREND, of Newark, in the county of Essex and State of New Jersey, have invented certain new and useful Improvements in Handcuffs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to an improved handcuff; and it consists in the construction and arrangement of parts, as will be hereinafter more fully set forth.

In the annexed drawings, Figure 1 is a side view of the handcuffs attached together. Fig. 2 is a side view of one of the cuffs unlocked with the top removed; Fig. 3, an inner view of the cap of the lock, and Fig. 4 a detail view of the eye.

In the drawings, A represents the casing of the lock; B, the bail, pivoted to one side of the casing A; C, the cap-plate; D, the eyes; E, link; F F', posts attached to the interior of casing A; G, locking-pawl working on post F; H, spring-arm working on post F'; I, spring working on post F, and its free end passing under a projection on the arm H; $a$, spring operating the locking-pawl; $b$, arm on locking-pawl to engage the key; $c$, recess in locking-pawl to receive the stop on the arm H; $d$, stop on arm H; $e$, bearing for key; $f$, turning key-plate; $g$, heads on eyes D; $h$, recess in casing A; $i$, lip on cap-plate C; $j$, opening in bail.

The casing A may be of any ordinary or desired construction to receive the lock mechanism, and is provided with a recess, $h$, to receive the head of the eye D.

The eye D is first made in the form shown in Fig. 4, and the link E, which is solid, placed therein, when the two ends are brought together until the opening is closed, and laid in the recess $h$, as shown in Fig. 2.

When the cap-plate C is fitted on the lip $i$ fits around the head of the eye and holds the eye firmly to the lock.

The bail B may be made of any desired size to fit the size of wrist to be held.

By pressing the bail down into the lock it is held by the locking-pawl until released by the use of the key, at which time the spring I, which has been pressed down by the end of the bail, will throw it open.

By this arrangement it will be seen that a self-locking handcuff is produced that is simply constructed and easily manipulated.

Heretofore much difficulty was found in putting on and taking off handcuffs, as the bail had to be pressed into position and the key used to lock them, and when they were unlocked the bail had to be drawn open; but by this device these difficulties are obviated.

The device is perfectly durable and not liable to be tampered with or get out of repair in use.

Having thus fully described my invention, what I claim as new, and desire to secure by Letters Patent, is—

1. The casing A, bail B, and cap-plate C, in combination with the link E, eyes D, and a suitable lock mechanism, substantially as and for the purpose set forth.

2. The casing A, bail B, cap-plate C, link E, and eyes D, in combination with the locking-pawl G, spring-arm H, and springs I and $a$, arranged and operating substantially as specified.

3. The casing A, having recess $h$, cap-plate C, having lip $i$, in combination with the link E, eyes D, bail B, and a suitable lock mechanism, substantially as and for the purpose set forth.

In testimony that I claim the foregoing as my own I have hereto affixed my signature in presence of two witnesses.

HERMANN AHREND.

Witnesses:
R. J. D. DUNN,
ABRAHAM MANNERS.